United States Patent

[11] 3,632,959

[72] Inventors Jerome W. Nelson;
James B. Randolph, both of Houston, Tex.
[21] Appl. No. 48,884
[22] Filed June 15, 1970
[45] Patented Jan. 4, 1972
[73] Assignee CRC-Crose International, Inc.
Continuation of application Ser. No. 755,035, Aug. 26, 1968, now abandoned. This application June 15, 1970, Ser. No. 48,884

[54] EXCHANGEABLE CARTRIDGE UNIT FOR AUTOMATIC WELDERS
10 Claims, 12 Drawing Figs.
[52] U.S. Cl. ........................................ 219/125 R, 219/60 A
[51] Int. Cl. ........................................ B23k 9/12
[50] Field of Search.......................... 219/59, 60 R, 60 A, 66, 124, 125 R, 131 F

[56] References Cited
UNITED STATES PATENTS
611,222  9/1898  Ries........................... 219/60 R
1,949,251  2/1934  Gilbert........................ 219/12 J
3,009,048  11/1961  Stanley....................... 219/60
3,084,244  4/1963  Rieppel et al................ 219/60
3,148,317  9/1964  Tripp.......................... 318/28
3,207,408  9/1965  Thome et al................. 219/125 X
3,268,708  8/1966  Thomas et al............... 219/125
3,441,710  4/1969  Foulquier et al............ 219/125
3,510,626  5/1970  Hasegawa................... 219/125

Primary Examiner—J. V. Truhe
Assistant Examiner—L. A. Schutzman
Attorney—Edwin M. Thomas ABSTRACT: A quickly exchangeable cartridge unit for automatic or semiautomatic welder machines, e.g., for welding, especially large diameter pipelines and the like, includes a small unit frame capable of being instantly attached to or detached from a carrier. The small frame includes means for holding electrode wire supply, a wire drive, and a welding head. The unit is designed particularly for travel, e.g., in an orbital path around the inner surface, forming a girth joint between abutted annular members but can be used also for external welding or in automatic plate welding, etc.

PATENTED JAN 4 1972

INVENTORS
JEROME W. NELSON
JAMES B. RANDOLPH
BY
Edwin M. Thomas
ATTORNEY

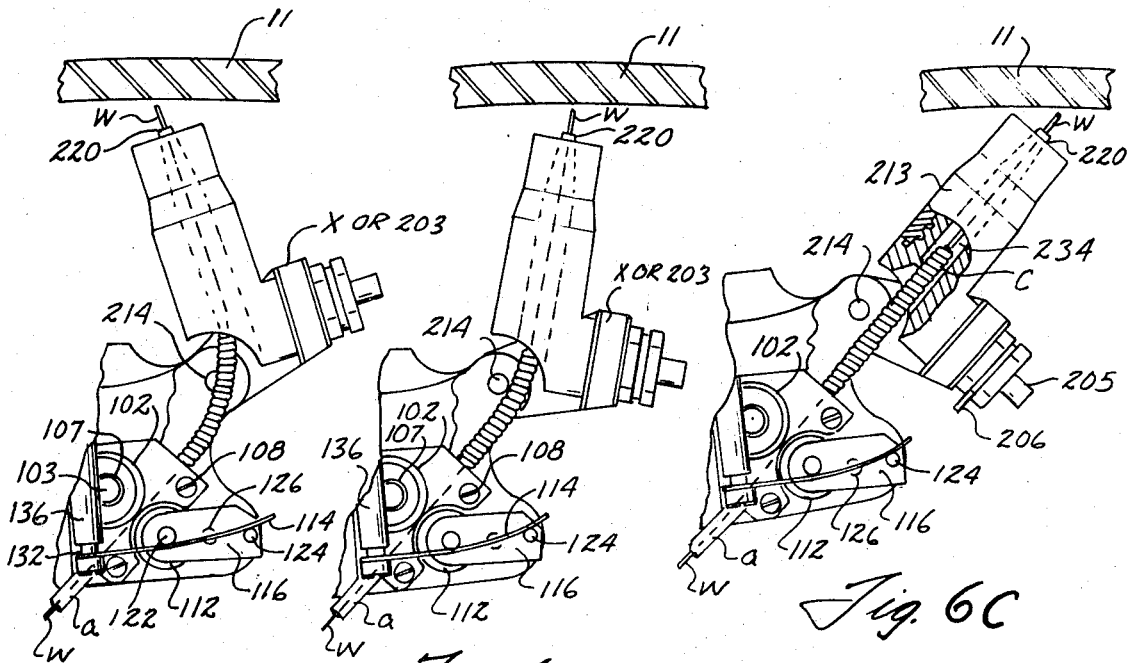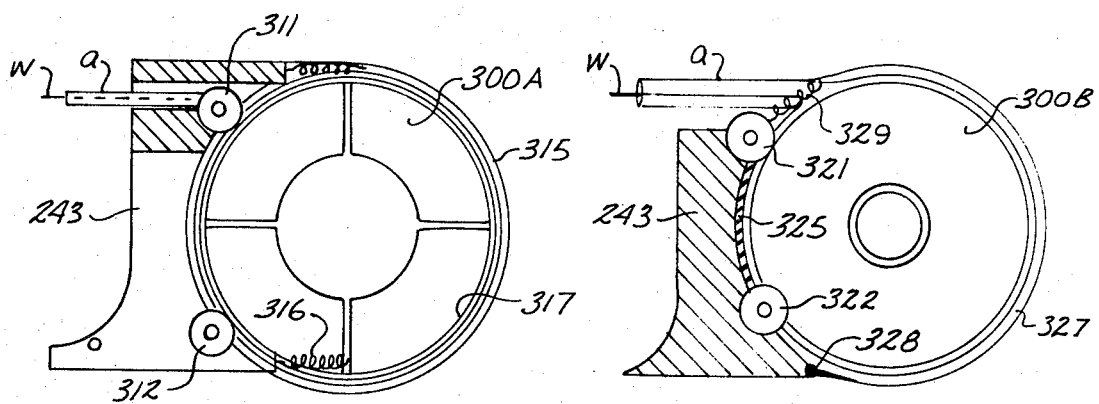

EXCHANGEABLE CARTRIDGE UNIT FOR AUTOMATIC WELDERS

RELATED APPLICATIONS

This application is a continuation of application Ser. No. 755,035 filed Aug. 26, 1968, now abandoned.

BACKGROUND AND PRIOR ART

Numerous efforts have been made in the past to design a machine for the efficient automatic or semiautomatic welding of girth joints in hollow tubular members and structures, especially in pipelines. These efforts have been only partly successful. Automatic or semiautomatic welding of large diameter pipelines in the field presents many difficulties, partly because of the rigid requirements for high-quality flaw-free welds. Past procedures generally have shown poor reliability because of problems in obtaining proper pipe end alignment, difficulties in holding the heavy parts during welding, close welding tolerances that are required, working under bad weather conditions, problems of operation and maintenance while working in dirt and mud, and the necessity for operating at a rate to keep up with rapid progress along the line, i.e., to keep up with the excavation crew and/or to keep ahead of the pipe-coating, wrapping and backfilling operations which follow behind, etc. A good welding "spread" may lay a mile or more of pipeline per day but welding frequently is a "bottleneck" in such operations. Successful automatic welding requires a high degree of precision in control of all elements, close alignment of parts, control of spacing or gap width between elements, stability of welding current and voltage, supply of electrode material at proper fee rates when consumable electrodes are used, supply of arc-shielding gas, etc. These requirements have been very difficult or impossible to attain in the field. Some very promising efforts have been made, with some apparent showings of success in many respects, but none has been entirely successful, as far as the present inventors are aware. Typical proposals of the prior art, many of them with excellent theoretical features, have been made or disclosed in U.S. Pat. Nos. 1,846,470, 2,428,161, 3,020,388, 3,084,243, and 3,223,816, for example.

In an application by Nelson, one of the present inventors and Sims, Ser. No. 608,872, filed Jan. 12, 1967, now U.S. Pat. No. 3,461,264, issued Aug. 12, 1969, system is described which departs in several ways from the previous proposed systems. It pertains to an apparatus and a method by which the welding unit is built into an internal clamp mechanism of more or less conventional design. A typical internal clamp suitable for this general purpose is described in U.S. Pat. No. 3,044,431. While the internal clamp means holds two adjacent pipe sections firmly and accurately in the proper position for welding, the welding mechanism per se is moved in an orbital path inside the joint. Thus, the girth joint is formed as more fully described in U.S. Pat. No. 3,461,264, in a plane defined generally by the adjacent pipe ends and more or less perpendicular to the common axis of said adjacent pipe ends. Alignment between the adjacent pipe ends is maintained by the clamp. At the juncture line, the welding device is supported and propelled around the joint, being kept in alignment therewith to form an internal weld bead. Depending on the thickness of the wall of the tubing or pipe, and depending also on the welding conditions, materials, etc., the resulting single-pass weld may extend all the way through the joint, or only part way through. It may be supplemented simultaneously or preferably later by external welding passes, which may be performed by machine or manually, the operations required depending on the conditions or equipment used and on the particular situation. In said application there is described in general terms a welding mechanism per se which is built into or combined with an internal clamp. This welding mechanism is designed to perform the bead-forming function rapidly and efficiently. The present invention is an improvement over the welding mechanism described in said application. It is designed particularly for use in machines of the same general type as that described in the application. However, it is suitable also for use in machines of analogous type and can be used also in machines of other types wherever small replaceable welding cartridges can be employed advantageously.

A particular problem arises in mounting orbitally movable welding equipment in or on an internal expandable pipe-holding clamp of the type mentioned above. In the first place space is always at a premium. The clamp elements, of course, limit this space, as they must be closely adjacent to the pipe ends. See FIGS. 3, 7, 8, 10A and 12 of the aforesaid U.S. Pat. No. 3,461,264, and description thereof. Secondly, for welding units making use of expendable or consumable wire electrode material, provision must be made for frequent and convenient electrode replenishment. Thirdly, under field conditions, the welding head and associated parts become spattered and/or corroded rather rapidly and must be cleaned, repaired or replaced at frequent intervals. Fourthly, while the welding head and/or contact tube operate closely adjacent the pipe wall during actual welding, the parts must be made readily retractable to an adequate distance while the mechanism is moved from joint to joint and/or while putting in place a new length of pipe to be attached to an installed pipeline or first pipe section.

All these requirements mean that the equipment must be miniaturized but still be rugged and reliable. It must be readily retractable to an inoperable position for movement of clamp and welding equipment axially of the pipe while also being firmly and accurately presented to and moved along the joint for the actual welding operation. To minimize downtime and facilitate the whole pipeline installation job it must be quickly removable, quickly repairable and quickly replaceable. At the same time it must be capable of firm and solid mounting in the carrier equipment so that it runs true along the joint line without lost motion or misalignment of any kind. The primary object of this invention is to design a welding unit that meets all these requirements.

BRIEF DESCRIPTION OF DRAWINGS

FIGS. 6A, 6B and 6C are diagrammatic and partially sectional views showing the contact tube, electrode wire guide means, and associated parts in various angular positions with respect to the work being welded.

FIGS. 7A and 7B show modifications of a wire supply cassette.

DESCRIPTION OF PREFERRED EMBODIMENT

Figure 1:
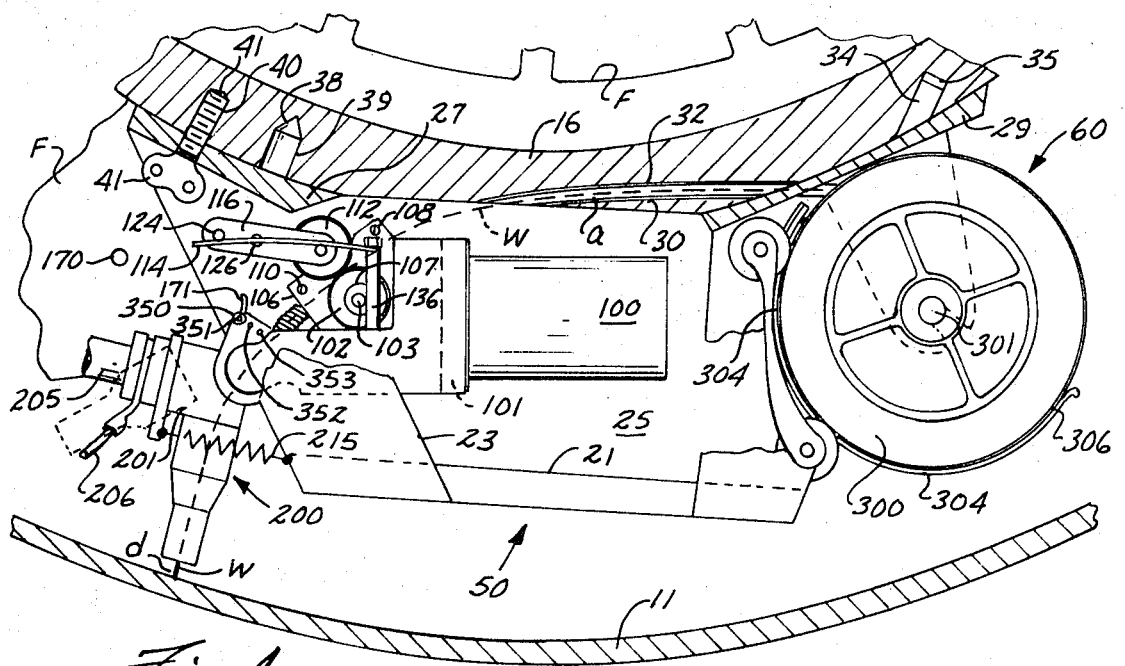
FIG. 1 is a side view of the welding cartridge including electrode supply and driving means.

Referring first to FIG. 1, there is shown fragmentarily a portion 11 of a pipe or large tubular member which is to be joined to a similar member in end-abutting relationship by a girth weld formed, initially at least, as an internal bead penetrating at least part way through the pipe wall thickness. A rotating ring 16 is shown fragmentarily also. The electrode-feeding assembly and welding head constitute a welding cartridge 50 designed to accomplish the following functions:

a. Supply consumable electrode wire $a$ at a positive and predetermined feed rate from a coiled supply 300 to a welding head 200.

b. Guide the electrode wire, preserving its original cast or curvature to approach the welding arc $d$ with the same orientation.

c. Permit changes in approach angle of the electrode wire to the arc without altering the effective length of the wire.

d. Monitor the wire feed rate continuously by tachometer means while comparing the tachometer signals to a reference signal, using appropriate electronic feedback equipment.
e. Supply the necessary welding current to the arc, while insulating the drive mechanism, etc., from the arc voltage.
f. Supply shielding gas to protect the arc effectively with minimal gas expenditure.
g. Permit rapid inspection and repair or replacement when necessary, of critical parts, and replenishment of electrode wire supply without major interruption of the welding operations.
h. Provide for complete removal and replacement of the cartridge with a minumum of inconvenience.

A baseplate 21, formed of aluminum or other light, strong metal, is mounted between pairs of sideplates 23 and 25. These plates are secured to footplates 27 and 29 through which the whole cartridge is attached to a rotating ring structure 16. Except for a flattened section 32, which may be provided with a groove 30 to accommodate a plastic guide tube $a$ for the electrode wire $w$, the rotating ring 16 has an essentially cylindrical outer surface. A slanted bore 34 receives a slanted pin or lug 35 secured to the footplate 29, whereas a radial bore 38 receives a radially inward projecting pin 39 secured to footplate 27. By this arrangement, when the cartridge 50 is to be attached to the ring member 16, the pin 35 is first inserted into slanted bore 34, then radial pin 39 is inserted into bore 38. This insures precise alignment when the footplate 27 is fastened down tight by a suitable fastener, e.g., a wingbolt 40 which is screwed into tapped opening 41 in the ring member. Any other quick release fastener can be used to hold the cartridge firmly in place while providing for quick and easy detachment.

The cartridge comprises a cassette structure 60 adapted to receive a spool 300 of electrode wire $a$, a drive mechanism 100 for said wire, wire guide means to be described in detail below, and the welding head 200. The latter will be described first.

Figure 5A:
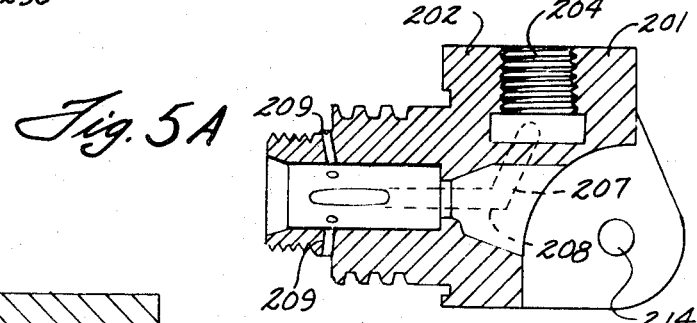
FIGS. 5A, 5B, and 5C are respectively longitudinal, sectional and part sectional views and a partial transverse sectional view of the contact tube base member.
Figure 5B:
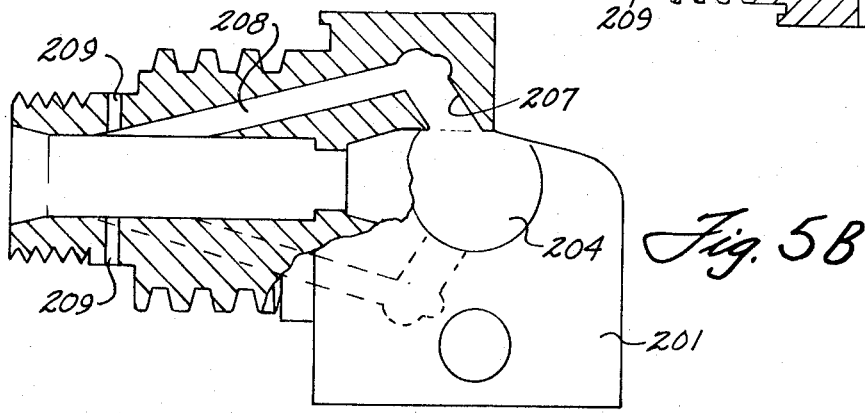
Figure 5C:
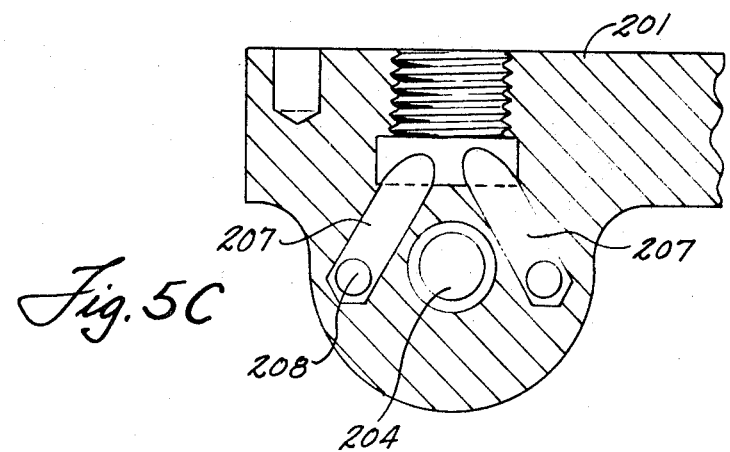

The welding head 200 comprises a main body member 201 of copper of the general design and shape shown best in FIGS. 5A, 5B and 5C. It has a plane base surface 202 for mounting on a pivoted support 203 and is bored and tapped at 204 to receive a hollow gas tube 205 through which an inert shielding gas is supplied from a suitable source. Welding current is supplied through a connection 206 from a suitable power source, not shown. Through one or more connecting bores 207 and distributing bores 208, the inert gas is led to a circle of small exit ports 209. A passage 210, FIG. 4, between a threaded part 230 of member 201 and a member 228 threaded on a smaller part 212, permits gas flow from ports 209 into an annular passage 211 which is located between a metal contact tube 220 and a ceramic or other insulated nozzle or shielding cup 213 spaced outwardly therefrom. Through this annular passage 211 the gas flows out to the arc, thus surrounding and shielding the hollow contact tube 220, FIG. 4. The latter has a small bore 222 through which the electrode wire $w$ is fed to the arc. The contact tube 220 is made of highly conductive metal, preferably copper. The contact tube 220 is securely but detachably fastened to member 201 by a slightly contractable metal ferrule 226, held in place under radial compression by an internally threaded cap 228 which screws onto the reduced threaded element 212 of base 201, as mentioned above. The ceramic shield or nozzle 213 screws onto a larger threaded part at 230 of the copper or other conductive base member 201. The contact tube element 220, as thus designed, is a small simple inexpensive part. This tube is exposed close to the arc and will corrode and burn out rather frequently; hence this part is designed to be replaced inexpensively. The tube 220 has an enlarged bore 232 at its inlet end, left in FIG. 4, sized to receive snugly but slidably the end of a helical wound tubular spring wire guide $c$ for the electrode wire $w$. This guide is relatively stiff so that it is not easily distorted, but it can be flexed to a gentle curvature, as seen in FIGS. 4 and 6A, 6B and 6C to accommodate various contact tube angles.

Welding in various positions around the girth of a large pipeline, as an example, may require that different angles of presentation of the wire to the arc be employed for various positions. Aside from this, it is necessary, in pipeline welding, to retract the welding head from contact or near contact with the inner surface of the pipe when the welding and carriage or clamping apparatus, etc., is to be moved to another position. By pivoting the head 200, etc., out of the way, which the flexible wire guide $c$ permits, it can be retracted away from the pipe wall to give adequate clearance without disconnecting or dismantling. As seen by comparing FIGS. 6B and 6C with FIG. 6A, the effective length of the wire electrode from its feed mechanism described hereinafter, to the arc, is not changed to a significant degree by changing the head angle. The head-supporting member 203 is pivotally secured to a frame or housing member 243, FIG. 3, by a pin 214. A tension spring 215, FIG. 1, secured between the head-supporting base member 203 and frame 243 tends to hold the head 200 projected towards the pipe, as in FIG. 6A, unless pushed to other positions such as FIG. 6B or 6C. Oscillating means, e.g., cam or travel vibrator types, can be used to cause the head to oscillate sidewise, if desired.

The resilient wire guide $c$ passes through or very near the center of the pivot axis 214. A slight sliding or extension space 234, FIG. 6C, is allowed in bore 232 of the contact tube 220 to permit if needed a slight sliding shift for $c$ due to shifts in angular position of head 200. The other end of guide $c$ is clamped by a screw 110 in insulated block 106, to be described further below, which is bored to receive $c$ and is split.

Figure 2:
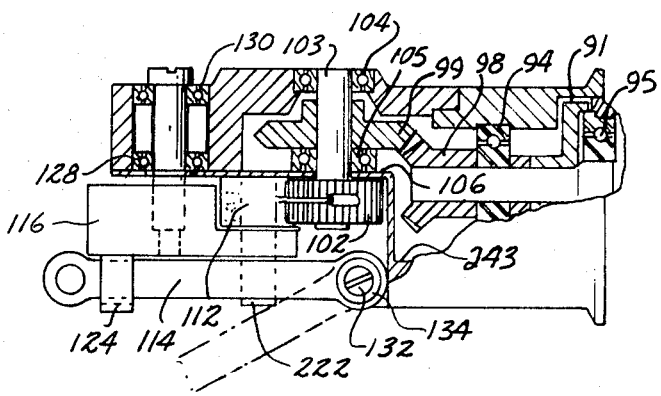
FIG. 2 is an enlarged fragmentary top view of the wire electrode driving or feeding means.

A wire drive roll 102 is fixed to a motor-driven shaft 103 mounted in ball bearings 104, 105, FIG. 2, in frame 243. A bevel gear 99, fixed to shaft 103 and driven by a bevel gear 98 on a shaft 97, also is mounted in ball bearings 94, 95 in frame or "motor head" 243. A gear 91 on shaft 97 drives a small electric-generator-type tachometer 90 through a gear 96. Shaft 97 is driven by an electric motor 100, FIG. 1, through a conventional gear reduction mechanism 101. The electric motor 100 is supported on the right end of frame or motor head 243. The bevel gear arrangement 98, 99, FIG. 2, permits disposing the motor 100 as shown in FIG. 1 with its axis in or parallel to the general plane of the weld, thus accommodating limitations on space, which may be encountered as when the clamp elements are close by on either side, as more fully described in the above-mentioned U.S. Pat. No. 3,461,264.

Figure 3:
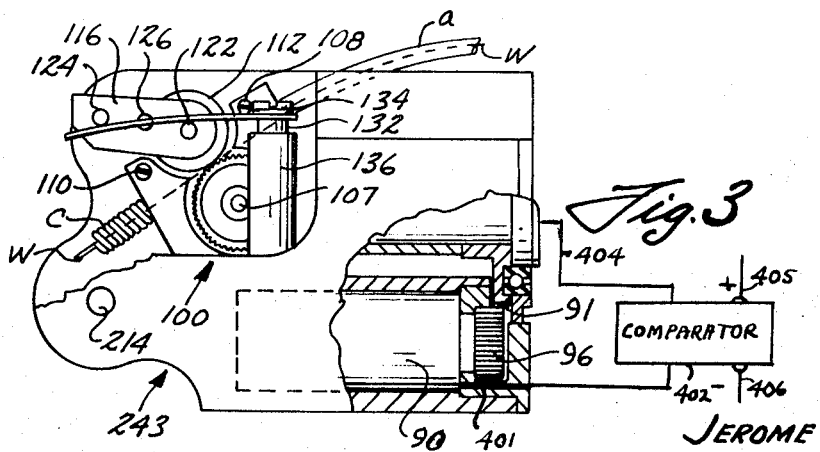
FIG. 3 is a side view of the mechanism of FIG. 2.
Figure 4:
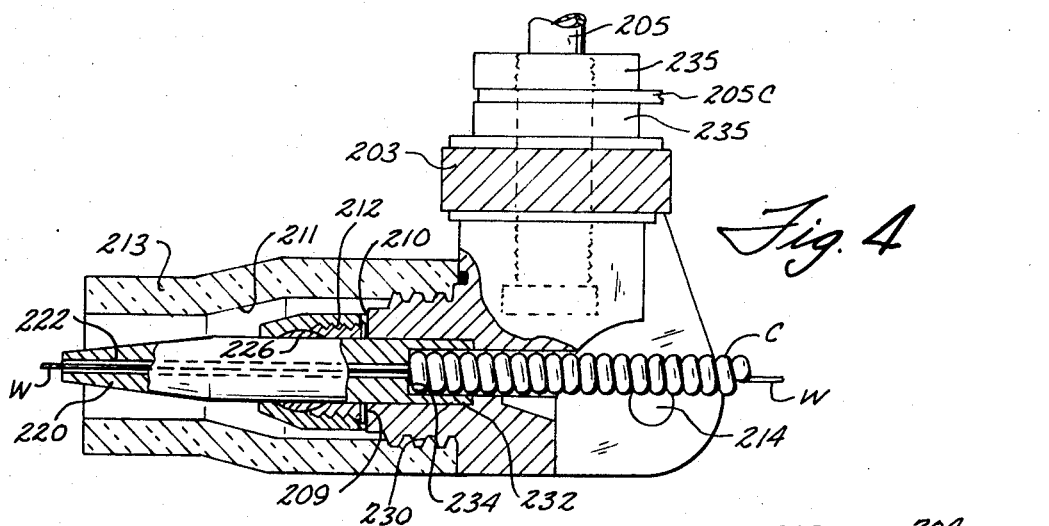
FIG. 4 is an enlarged view, partly in section, of the contact tube, electrode-guiding means, and related parts.

Wire feed roller 102 is insulated from its shaft 103 by an interposed annular insulator 107 and from frame 243 by an interposed part of insulator 106, FIG. 2. A backup roller 112, also insulated from its support shaft 122 and from housing 243, is mounted opposite feed roll 102 on a rocker arm 116 pivoted at an intermediate point on a pin 126 fixed to arm 116 and mounted in ball bearings 128 and 130. A dowel pin 124, fixed to the outer end of arm 116, is notched on its lower surface, as seen in FIGS. 2 and 3, to latch in place a stiff leaf spring 114 designed to apply wire-gripping pressure to rolls 102 and 112. This spring is pivoted for movement in its own plane or parallel to the roller axes on a shoulder screw 132 covered by an insulative sleeve 136. Near its right end, spring 114 presses down on an extension of shaft 122, thus tending to rotate arm 116 clockwise, as seen in FIGS. 1 and 3, about its pivot point 126. Arm 116 extends in two directions from its intermediate pivot point 126. The outer or left end of spring 114 applies upward force on dowel pin 124, thus reinforcing the torque or pressure on roll 112 against roller 102. By this means, single sense torque is applied by spring 114 to a plurality of points or arm 116, resulting in considerable gripping force being applied to roller 112 which presses the electrode wire $w$ against the roughened or knurled and very hard wire-driving surface of roll 102. The result is that the hard electrode wire $w$ is positively gripped and driven when the feed roller 102 is rotated. When access to the drive roll is desired, the roll 112 can be disengaged and lifted into the dotted-line position, FIG. 3, by first pressing down on the outer end 115 of spring 114 to disengage it from the notch in dowel 124, then swinging the spring off the pin 122 to the dotted-line position of FIG. 2. Then arm 116 is free to rotate to the dotted-line position of FIG. 3. This is a simple but versatile means for applying adequate gripping pressure to feed rollers. It may be used for positively gripping and feeding hard wire, tapes and other materials that may be difficult to feed positively. The pressure thus applied to the bite between the feed rollers can be adjusted either by moving screw 132 in or out in base 243 or by changing or inserting shims or washers 134 under its head.

A flexible wire guide or tube $a$, FIGS. 1 and 3, for leading wire into the rollers, is made of an insulative material, such as a plastic polymer or a fiber-reinforced polymer of any suitable type. The end of this guide tube is clamped in a split opening formed in insulator 106, by means of clamping screw 108.

The electrode wire $w$ is supplied from a plastic or other electrically nonconductive spool or reel 300. In FIG. 1 this spool is shown as having a hub or axle portion 301 adapted to seat in a forked bracket 302. The wire is directed into the insulative guide tube $a$, and on through feed rollers 102, 112, and guide member $c$, through the contact tube 220 and to the arc or burn-off point $d$, FIG. 1. Since the spool 300 has some width, the adjacent end of guide tube $a$ must be permitted to wander from side to side as the wire is unreeled. For this purpose, the groove 30 in support member 16, FIG. 1, is widened at the spool end. The end of the guide $a$ is beveled and extended far enough to the right, FIG. 1, that the wire cannot contact the ring 16 which is metallic and would form an electrical short circuit.

A feature of significance is the means by which the coiled wire $w$ on spool 300 is kept under control. If turned loose the springy electrode wire $w$ may uncoil and tangle, causing short circuits and/or feed failure. To prevent this, the coiled wire is kept snug around its spool, e.g., by resilient pressure applied by a flexible insulative strip or band 306. The latter is kept under tension around a major part of the spool circumference by a resilient spring member 304. A "negator"-type spring may be used, as seen in FIG. 1, but any suitable tension means can be employed, bearing in mind the fact that the spooled wire must be kept under some tension and out of contact with metal parts which otherwise would permit a short circuit.

An alternative arrangement is shown in FIG. 7A where a nonconductive spool 300A, which may be hubless, is received in a cassette having a pair of antifriction rollers 311, 312 adapted to support and guide the spool flanges while a friction surfaced spring leaf brake member 315, having at least one end secured by a tension spring 316, and covered with insulator material 317, applies friction to the wire surface on the spool. As the spool unwinds, the diameter of the wire coils diminishes but the frictional force resisting unwinding remains substantially constant. This assures a constant, reliable rate of wire feed. Uncoiling and tangling are effectively prevented.

Still another arrangement is shown in FIG. 7B. A spool 300B is mounted much as in FIG. 7A, with its flanges engaged and guided by rollers 321, 322. An insulative guard member 325, e.g., of "Teflon" or other strong, durable nonconductive material restrains the wire which otherwise might spring out or uncoil and make contact with the metal frame. A nonconductive "brake band" type of enclosure 327 surrounds the flanges of spool 300B, applying friction thereto because the band is anchored at 328 at one end and held under tension by a tension spring 329 at the other. In this case the brake band enclosure continues on to merge into the wire guide $a$, so that there is no discontinuity between the spool cover or brake and the guide. The wire spool can be inserted by unlatching the cover at the bottom, FIG. 7B, and inserting the spool, the wire $w$ being first pushed through its guide tube $a$, to the bite of the feed rollers 102, 112. The cover is then relatched to keep the wire in place, and wire feed will commence whenever power is applied to drive the feed rolls.

It will be understood that the whole cartridge can be removed quickly from the welding machine for inspection, replenishment of wire supply, inspection, or repair, etc., of the contact tube, feed rollers, etc., with only very limited interruption of the welding operation. While these cartridges are designed particularly for use in machines which combine an internal pipe clamp with an internal orbital welder, they are not restricted to such use. Machines of this type are designed to use as many as four or more cartridges, each cartridge being used to form only a part of the girth weld. Thus, an orbiting welding head carrier ring 16 mounting four cartridges or heads may complete a girth weld, with all four heads firing at once, in about 90° of arc rotation. With two heads firing at a time, two 90° segments of the weld may be produced at one 90° rotation, the other two segments being welded subsequently by the other two, etc. Various other arrangements are contemplated but they are not part of the present invention.

However, the equipment of this invention is not necessarily limited to use in pipeline welders or even in the welding of circular or arcuate members. These cartridges may be used for welding straight line joints, e.g., between the edges of plates. They may be used in almost any conceivable carriage mechanism, wherever it is desirable to have a replaceable welder cartridge, consisting of a unitary or packaged wire supply, feed mechanism, and welding head. By use of conventional oscillator or zigzag movement means for spreading the weld wider, the head may be used for filler welding of a wide gap.

It will be understood that in normal welding operations the welding head 200 will be positioned more or less as shown in full lines in FIG. 1, so that the wire $w$ is projected into the arc at point $d$. The particular angle of projection may need to be adjusted from time to time, or at certain stages of a weld, by any suitable means, the head possibly assuming at times the various positions shown in FIGS. 1, 6A, 6B or 6C. The ways in which some of these adjustments are obtained, manual or automatic, are not all shown in detail herein, forming no part of the present invention. The dotted-line retracted-head position of FIG. 1 may be suitable when the assembly is moved along the pipeline.

When a welding operation inside a pipe joint is completed, assuming that the equipment is being used for pipeline construction, the welding head will be retracted to an inoperative position, as in FIG. 6C, so that the equipment can be moved through the pipe to another joint. Otherwise, the welding head which during welding is necessarily close to the pipe wall might be damaged or the movement of the equipment on its supporting rings 16, etc., could be blocked.

The carrier ring 16 is supported on a suitable fixed base or frame within the pipe, preferably the frame of an internal expandable pipe-clamping mechanism. This whole unit is capable of being moved through the pipeline from joint to joint and in such use the head or heads must be retractable to travel position.

Wire-feeding speed can be a critical factor and close surveillance is maintained by the tachometer 90 which gives an electrical signal through a line 401 to a comparator of known type 403. In the latter, a reference voltage is provided, which can be adjusted to various levels, corresponding to a desired rate of wire feed. The comparator compares the tachometer output voltage, which is related to instantaneous tachometer feed, with the reference and automatic means, of known type, arranged to change the speed of the variable-speed wire feed drive motor 100, through its input line 404. Power is supplied from a suitable source, e.g., a battery within the clamp frame structure, to leads 405 and 406 of the comparator.

In order to retract the welding head 200 to inoperative position, i.e., to the dotted-line position shown in FIG. 1, suitable retracting means are provided. When the orbitally movable cartridge unit 50, which of course includes welding head 200, reaches the terminal position in its welding operation, it is tripped or retracted to its inoperative position by means which will next be described.

Fixed to a nonmovable element of the frame which supports rotating ring 16, which frame is only indicated generally at F, FIG. 1, and is not described in detail herein, is a trip pin 170.

This pin is adapted to engage a rocker arm 171 secured to the welding head base element 201. Thus, when the head approaches the end of its orbital welding stroke or movement, the rocker arm 171 which travels with it engages pin 170 and is tripped to the inoperative position, rotating the welding head 200 about its pivot 239 from full-line to dotted-line position, FIG. 1. A spring-pressed detent means 350, secured to the cartridge frame member 23, is adapted to engage a notch or recess 352 in the welding headblock when the latter is rotated to inoperative position. This locks the head in the inoperative position. The spring detent 350 must be strong enough to resist any restorative tendency of guide coil c.

When the next welding operation is to be undertaken, the orbitally movable cartridge is rotated in the opposite direction to engage pin 170 with rocker arm 171. This forces the detent 350 out of notch 351 and rotates the head 200 to its operative position. One or more operative detent notches 353, 354 may be provided in the headblock to hold it in a desired angular position for welding, i.e., in one of the positions of FIG. 6A, 6B or 6C. Another pin or cam on the fixed frame may be used to engage rocker 171 for this purpose although, as noted above, this is not a particular feature of the present invention. Alternatively, the welding head may be normally spring biased to operative position when not latched out by detent 350.

It will be noted that the replaceable unit is insulated both electrically and thermally to prevent undue soak back of heat from the welding arc as well as to prevent short circuits. Otherwise, the electrically insulative mountings for the wire feed rolls, wire supply, guide means, etc., might be damaged or destroyed. The latter parts are made of thermoplastic materials such as "Nylon," "Teflon," rubber, etc., which cannot withstand excessively high temperatures. A head shield 360 is shown around the welding head and the baseplate 21 is lined with an electrical insulator interiorly so that the likelihood of electrical short circuits from a misguided electrode wire w or other parts will be minimized.

The insulating and wire guide means a which leads the wire w from supply reel 300 to the feed rollers 102, 112, is made in one piece, preferably. This gives precision wire lineup with the feed rollers and is easy to clean.

The tachometer 90, described above, is preferably buried or enclosed within the frame which supports the wire drive rolls, etc. This tachometer gives a voltage signal which indicates constantly and accurately the wire feed speed. This speed is a critical factor in precision automatic welding. The drive motor for the wire feed is capable of being driven at a variably controlled speed so as to feed electrode wire at the optimum rate for the particular welding operation. The system described thus makes it possible to observe the wire feed speed and to correct it with accuracy when correction is needed. It will be understood that the signals from the tachometer and the motor controls, etc., are led through suitable electrical conductors, etc., out of the pipe being welded (through the outer end thereof) to a control panel or other station. The details of this are not shown, being quite obvious to those skilled in the art.

Obviously, various facilities may be used for conducting the necessary welding current, gas, etc., to the units. The extent to which the cartridges of this invention may be rotated about an axis, e.g., in a tube or pipeline, will depend largely on the limitations of connections to service lines, etc. By use of sliprings, etc., continuous rotation through multiple turns may be permissible. Ordinarily, however, it is not advisable to try to rotate such equipment through arc larger than a complete circle and it commonly will be desirable to rotate through smaller angles. Thus, while a single cartridge unit may be used to form a complete 360° girth weld at a single continuous operation, ordinarily it may be preferable to form not more than 180° of weld in one direction and then complete the circle or the girth weld around a full 360° by proceeding 180° or less in the other direction. Gaps may be filled in by additional units, if desired. These and other uses will be apparent to those skilled in the art, and need not be described here in greater detail.

Obviously, the invention is susceptible to many variations and modifications. It is intended by the claims which follow to cover such as would occur to those skilled in the art as broadly as the prior art properly permits.

What is claimed is:

1. In a miniaturized replaceable cartridge-type welding apparatus adapted for joining in a girth weld the adjacent ends of annular workpieces such as large diameter pipes and similar tubes which have a common axis at said adjacent ends defining a general plane in which the girth joint is located, said cartridge being adapted to travel in an orbital path around said common axis and adapted to be entirely confined in an annular travel path, the combination which comprises a unit frame, a welding nozzle pivotally mounted in said frame for movement between a projected welding position and a retracted nonwelding position means for moving said nozzle between said positions, means on said unit frame for mounting a reel of consumable electrode wire with its axis perpendicular to the plane of the joint, a pair of wire feed rollers mounted in said unit frame with their axes perpendicular to the plane of the joint, a guide tube for the wire between the reel and said rollers, a flexible resilient guide tube for the wire between said rollers and the movable welding nozzle adapted to yield to the nozzle movement, a wire drive motor mounted with its axis generally in or parallel to the weld plane and to accommodate said close confinement, said motor being geared to one of said feed rollers for positive feeding and control of said wire, and quick release means on said unit frame for detachably securing the cartridge to an independently driven carrier which also travels orbitally about said common axis.

2. A cartridge according to claim 1 in which the wire-guiding means is a stiffly resilient tubular conduit surrounding the wire which conduit is sufficiently flexible to permit said head movement from welding to nonwelding position without sharp bends in the electrode wire.

3. A cartridge according to claim 2 in which the resilient tubular conduit passes substantially through the axis of pivot of the welding head so as to avoid any substantial change in length of electrode wire between the wire-feeding means and the head when the head is moved about the pivot axis.

4. A cartridge according to claim 2 which further comprises a resilient means for holding the head in its welding position during a welding operation.

5. A cartridge according to claim 2 wherein the tubular conduit is slidingly engaged in said head so as to permit a small amount of relative movement between the conduit and the head as the head is moved about its pivot axis.

6. A cartridge according to claim 1 comprising means for oscillating the welding head laterally during its travel along the welding path.

7. A cartridge according to claim 1 in which the means for holding the reel includes a cassette for enclosing and preventing premature unwinding of the wire on a reel and including flexible and insulated wire guide means extending between the cassette and the wire-feeding means.

8. A cartridge according to claim 1 wherein the support means for the welding head comprises a subframe fastened in the unit frame, said subframe including a pivotal mount on which the welding head is secured to permit its movement between the projected welding position and the retracted nonwelding welding position.

9. A cartridge according to claim 1 which includes a tachometer and means connected to the electrode wire-feeding means for driving said tachometer to indicate the rate of wire electrode feed.

10. A cartridge according to claim 9 which includes means for relating the wire feed rate signal to a reference signal for controlling the wire feed rate.

* * * * *